United States Patent Office 3,315,003
Patented Apr. 18, 1967

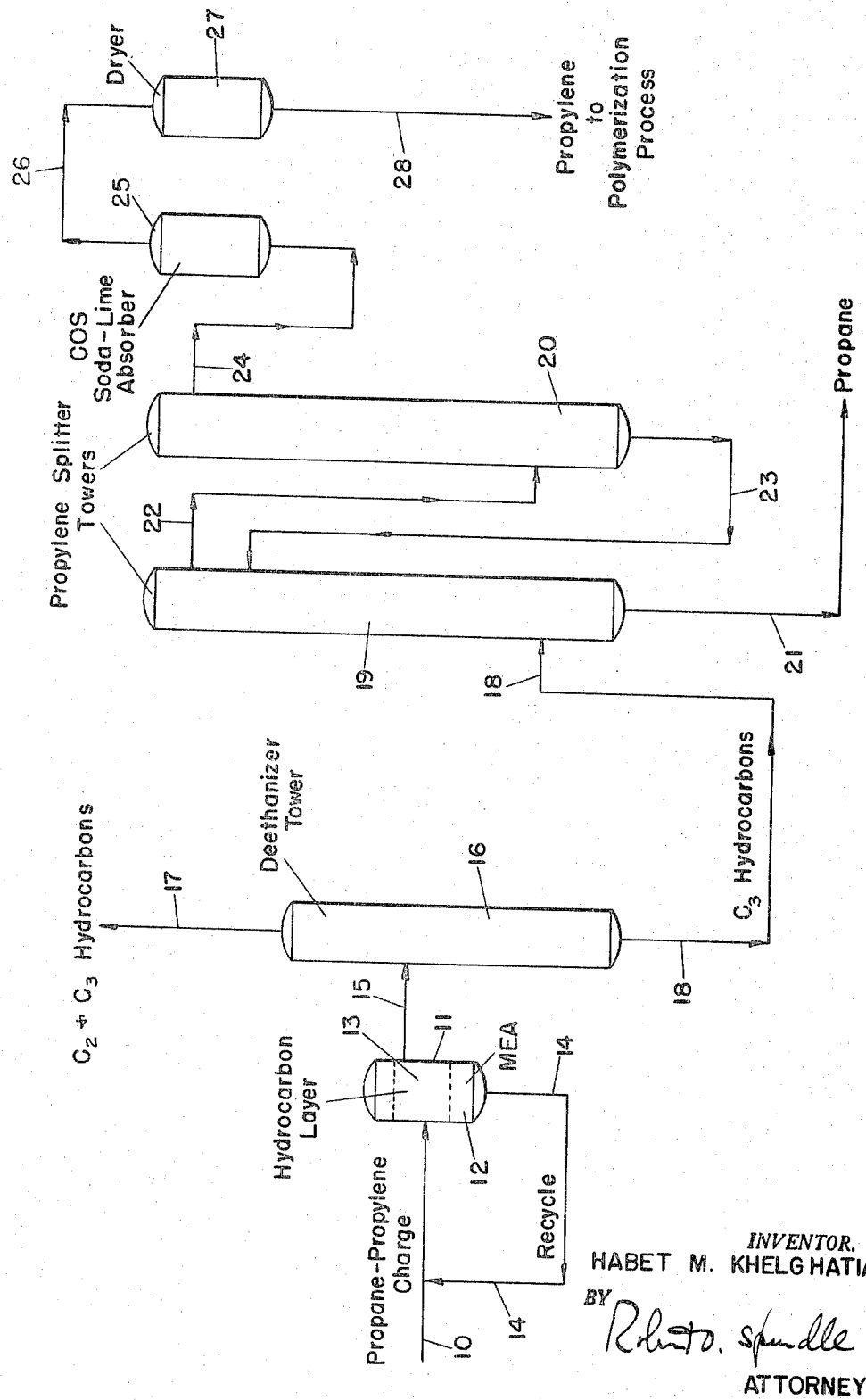

3,315,003
PROCESS FOR REMOVING CARBONYL SULFIDE FROM NORMALLY GASEOUS HYDROCARBONS
Habet M. Khelghatian, Springfield, Pa., assignor to Sun Oil Company, Philadelphia, Pa., a corporation of New Jersey
Filed Aug. 26, 1960, Ser. No. 52,211
6 Claims. (Cl. 260—677)

This invention relates to a process for removing carbonyl sulfide from liquefied normally gaseous hydrocarbons. It particularly relates to a process for removing carbonyl sulfide from liquefied propylene and to the advantages thereby gained in the polymerization of propylene to normally solid high molecular weight polymer. Specifically, it relates to a process for recovering carbonyl sulfide-free propylene from a mixture of normally gaseous hydrocarbons.

The demand for propylene as feed stock for the growing polypropylene industry has increased steadily in recent years. An important source of this basic material is the $C_3$ hydrocarbons produced in the various refining and cracking processes to which petroleum oils are subjected. These petroleum gases contain appreciable quantities of sulfur containing compounds which must be removed in order to produce an acceptable feedstock for further processing or to produce a commercially acceptable product.

In addition to the well-known sulfur compounds such as hydrogen sulfide and mercaptans, there is a small quantity of carbonyl sulfide (COS). Usually COS is present in these hydrocarbon gases to the extent of only several hundred parts per million (p.p.m.) by weight but usually, this amount is beyond the allowable limits of an acceptable product. Since carbonyl sulfide is almost always formed when carbon, oxygen, and sulfur or their compounds such as carbon monoxide, carbon disulfide are brought together at high temperatures, this compound is most frequently found in the gases from thermal and/or catalytic cracking operations, although, in some cases, it has been noticed in virgin petroleum fractions.

To some extent, carbonyl sulfide is not as reactive as its companion in hydrocarbon gases, hydrogen sulfide. According to Kirk-Othomer's "Encyclopedia of Chemical Technology," volume 13, pages 384 to 386, 1954 edition, carbonyl sulfide reacts slowly with aqueous alkali-metal hydroxides and is only slowly hydrolyzed to carbon dioxide and hydrogen sulfide. This relatively unreactive characteristic of carbonyl sulfide makes it extremely difficult to remove from petroleum streams by conventional desulfurization techniques.

It is an object of the present invention to provide a process for effecting substantially complete removal of carbonyl sulfide from liquefied normally gaseous hydrocarbons.

It is a further object to provide a process for the recovery of carbonyl sulfide-free propylene from a mixture of normally gaseous hydrocarbons.

It is still a further object to provide improvements in the process for preparing high molecular weight normally solid polymers of propylene by means of a polymerization catalyst system which is adversely affected by carbonyl sulfide.

It has been found that carbonyl sulfide can be effectively removed from normally gaseous carbonyl sulfide-containing hydrocarbons by first liquefying the hydrocarbons and then contacting them with soda-lime. It has also been found that the use of carbonyl sulfide-free propylene substantially increases the rate of reaction in polymerizing propylene to a high molecular weight solid polymer using a Ziegler type of catalyst system.

Pursuant to the present invention, a normally gaseous hydrocarbon, specifically, propylene, is liquefied and passed into a contacting zone containing soda-lime. The propylene effluent from the contacting zone is substantially free of carbonyl sulfide. However, since the removal of carbonyl sulfide produces a net increase in moisture content, the effluent propylene should be dried such as by passing the moisture-containing propylene through a bed of molecular sieves, calcium chloride, alumina, or the like.

In a particular embodiment of the present invention, a mixture of normally gaseous hydrocarbons composed mainly of $C_2$, $C_3$, and a small amount of $C_4$ hydrocarbons is charged in liquid phase to a separation zone in intimate contact with, say, aqueous monoethanolamine. The MEA is preferably a 20% solution and is usually recycled for more efficient operation. This MEA-scrubbing removes from the mixture of hydrocarbons the acid gases $H_2S$, $CO_2$, etc. and part (from 20% to 90%) of the carbonyl sulfide. These MEA-scrubbed hydrocarbons of reduced carbonyl sulfide content are then passed into a first distillation zone, i.e., a de-ethanizer, wherein the $C_2$ and lighter components, i.e., those hydrocarbons containing primarily less than three carbon atoms per molecule plus residual acid gases are removed overhead and the $C_3$ and heavier hydrocarbons are removed as a bottoms product composed mainly of propane and propylene. The bottoms product from the first distillation zone is then passed into a second distillation zone wherein a liquefied hydrocarbon stream comprising essentially propane is separately withdrawn as a bottoms product which is sent to, say, LPG (liquefied petroleum gas) storage. A hydrocarbon stream comprising essentially propylene, e.g. 99+% propylene, is separately withdrawn as an overhead product. The propylene is then passed in liquid phase into a contact zone containing soda-lime to remove substantially all of the carbonyl sulfide. The substantially carbonyl sulfide-free propylene is passed into a drying zone containing, say, molecular sieves, whereby residual moisture is substantially removed. The recovered propylene is now substantially carbonyl sulfide-free, i.e., less than 10 p.p.m. and is substantially moisture-free.

To further demonstrate the utility of the present invention, the previously soda-lime treated propylene containing less than 10 p.p.m. carbonyl sulfide, preferably less than 5 p.p.m. is contacted, under polymerizing conditions, with a catalyst such as titanium trichloride and an activator therefor such as diethylaluminum monochloride to produce a high molecular weight, i.e., greater than 20,000, normally solid polymer.

The term "soda-lime" as used herein is defined as lime which has added thereto sodium hydroxide and sometimes is described as a mixture of "soda and lime." The mixture should be in pellet form of from 5 to 20 mesh size, preferably 8–12 mesh. The term "lime" includes quicklime and hydrated lime. Lime is prepared from limestone which is a rock composed of at least 50% calcium carbonate with varying percentages of impurities present. Limestone in its broadest sense includes any calcium containing material such as marble, chalk, travertine, coral, etc. These limes may contain from 5% to 45% magnesium carbonate. Usually, however, limestone refers to stratified calcareous rock composed mainly of the mineral calcite. Upon calcination, limestone yields the lime of commerce.

The calcination of limestone under carefully controlled conditions drives off carbon dioxide leaving primarily calcium oxide and magnesium oxide, otherwise known as quicklime. Treating quicklime with enough water to satisfy its chemical affinity for water produces a dry powder known as hydrated lime. Hydrated lime is essentially calcium hydroxide or a mixture of calcium hydroxide, magnesium oxide, and magnesium hydroxide.

The soda-lime of the present invention consists of lime obtained as above described which has added thereto a minor amount of sodium hydroxide. The amount of sodium hydroxide calculated as sodium may vary from 1% to 10% but is preferably from 2% to 4%. The soda-lime may contain minor amounts of potassium. A typical sample of soda-lime used herein for illustration purposes, contains from 2.6% to 3.2% sodium hydroxide calculated as sodium with the remainder being calcium hydroxide, a small amount of potassium hydroxide, and water, either as water of hydration and/or free moisture. The water of hydration may amount to 14% to 18% with the free moisture content varying between 0.5% to 5%. The soda-lime used in this invention is a commercially available commodity.

The crystalline polypropylene produced by the process of this invention is prepared by polymerizing substantially carbonyl sulfide-free propylene with a solid catalyst maintained as a dispersion in an inert, liquid diluent, such as n-heptane or isooctane. The solid catalyst is preferably a halide of a metal such as zirconium, chromium, vanadium, molybdenum or titanium. It is distinctly preferable for the metal to be in a valence state other than its highest valence state. Thus, a lower halide of titanium such as titanium trichloride or titanium dichloride, or a mixture thereof, is preferred. The metal halide is used with an activator therefor such as trialkyl-aluminum. For example, aluminum triethyl, aluminum triisopropyl, aluminum tri-n-propyl, or aluminum triisobutyl are suitable activators and give good results. However, preferred activators include the aluminum alkyl halides such as monoalkyl-aluminum dichloride, dialkyl-aluminum monochloride, and alkyl-aluminum sequichloride. The alkyl groups in each compound may contain from 1 to 4 carbon atoms per molecule. Generally, a mole ratio of activator to metal halide of 1:1 to 12:1 is used. Temperatures of from about 0° C. to 170° C. are suitable. Atmospheric pressure can be used although elevated pressures are preferred in that the polymerization reaction proceeds at a faster rate at such elevated pressures, say up to about 10,000 p.s.i. (pounds per square inch gauge). Polypropylene is recovered from the reaction system by draining the inert, liquid reaction medium, and the catalyst is deactivated and removed by contacting the polypropylene with water, alcohol or an aqueous or alcoholic solution of an inorganic acid, such as nitric acid, with vigorous agitation. Preferably, such agitation provides for comminuting the polymer during the contacting with the catalyst deactivating liquid to insure good catalyst deactivation. The polymer is then repeatedly washed to remove at least a major proportion of the residual inorganic material from the catalyst, and is then dried. The described procedure yields a product which is a mixture of a predominant amount of crystalline polypropylene with a minor amount of amorphous polypropylene. The amorphous polymer can be removed by dissolution in a hydrocarbon solvent at an elevated temperature below the temperature at which the crystalline polymer is dissolved. For example, dissolution of the amorphous polymer in n-pentane at the boiling point of n-pentane (under atmospheric pressure), or n-heptane, iso-octane, tetrahydronaphthalene, decahydronaphthalene, or the like gives good results. A quantity of the amorphous polymer, by which is meant the polymer which is soluble in n-pentane at the boiling point of n-pentane under atmospheric pressure, say up to about 20% by weight, can be present with the crystalline polymer. The crystalline polypropylene will generally have a molecular weight of from about 20,000 to 300,000 and usually from about 50,000 to 250,000, a melting point of from about 161° C. to 171° C., and exhibits a crystalline structure by X-ray analysis. The polypropylene may be combined with a small quantity of oxygen, such as from oxidation by contacting air. Generally, the quantity of oxygen is below about 0.1%. In order to prevent excessive oxidation, it is advantageous to incorporate an oxidation inhibitor in the polymer shortly after or during the preparation. The presence of the inhibitor, in the quantities required to substantially completely prevent oxidation, does not adversely affect the composition of the polypropylene.

As a specific illustration of the particular embodiment of this invention, the following example is offered with reference to the figure: A mixture of normally gaseous hydrocarbons containing 50 p.p.m. carbonyl sulfide and comprising essentially 1.6% $C_2$ hydrocarbons, 39.6% propylene, 55.1% propane, and 3.7% $C_4$ hydrocarbons is charged in liquid phase through line 10 at a rate of 21,600 pounds per hour (120 barrels per hour), a temperature of 109° F., and a pressure of 395 pounds per square inch gauge (p.s.i.g.) to a settler 11 through which a 20% aqueous solution of monoethanolamine is circulating via line 14 at a rate of 200 barrels per hour in intimate contact with the incoming charge mixture. In the settler, the monoethanolamine breaks out into layer 12 wherein 90% of the COS has been adsorbed. The charge mixture, containing 5 p.p.m. COS, is removed from hydrocarbon layer 13 via line 15 into the de-ethanizer tower 16. Approximately 2,400 pounds per hour (14 b./h.) comprising 38.3% $C_2$ hydrocarbons, 43.7% propylene, 17.9% propane, and 0.1% $C_4$ hydrocarbons (all gas volume percent) are withdrawn through line 17 and sent to a gas recovery unit (not shown). The heavier hydrocarbons, are withdrawn at a rate of 19,200 pounds per hour (109.5 b./h.) via line 18 and passed into propylene splitter tower 19. The bottoms product comprising 8.3% propylene, 85.4% propane, and 5.7% $C_4$ hydrocarbons is removed through line 21 at a rate of 12,960 pounds per hour (72 b./h.) The overhead product from tower 20 containing 15 p.p.m. COS and comprising 99.75% propylene and 0.25% propane, is condensed in a cooler (not shown) and charged in liquid phase to obsorber 25 via line 24 at a rate of 6,240 pounds per hour (34 lb./h.), a temperature of 102° F. and a pressure of 282 p.s.i.g. The absorber is filled with 3,000 pounds of soda-lime. The effluent, containing <0.5 p.p.m. COS is removed from absorber 25 through line 26 and passed through dryer 27 which contains 3,000 pounds of 5 A. (Angstrom) molecular sieves. The finally purified propylene removed from the dryer 27 through line 28 is thus substantially carbonyl sulfide-free and moisture-free.

The purified propylene is charged from line 28 into a polymerization process (not shown) wherein the propylene is polymerized at 66° C. using a $TiCl_3$-$AlEt_2Cl$ (titanium trichloride-aluminum diethyl monochloride) catalyst system to a solid polymer as shown in Example I following.

The hereinabove referred to percentages are all liquid volume percent unless otherwise indicated.

In order to illustrate the improved processes of this invention and its accompanying advantages, the following examples are presented.

*Example I*

Propylene of 99+% purity was polymerized at 66° C. using a $TiCl_3$-$AlEt_2Cl$ catalyst system. The effect of carbonyl sulfide on the rate of reaction is illustrated as follows:

| Carbonyl Sulfide Content, p.p.m. | $TiCl_3$, lb./gallon | Al/Ti, mol ratio | Reaction Time,[1] hours |
|---|---|---|---|
| 40 | 0.0035 | 2/1 | 10.6 |
| 40 | 0.0035 | 4/1 | 3.9 |
| Nil[2] | 0.0040 | 2/1 | 4.0 |

[1] The time to make a 14% slurry.
[2] 0-5 p.p.m. COS.

The above data indicates that the presence of 40 p.p.m. carbonyl sulfide in the propylene requires a 4/1 aluminum to titanium ratio to obtain the same rate of reaction as a substantially carbonyl sulfide-free propylene gives at a 2/1 ratio. It is concluded, therefore, that substantial savings in catalyst consumption can be realized by removing the carbonyl sulfide from the charge propylene. To achieve this benefit, the propylene should contain less than 10 p.p.m. of COS, preferably less than 5 p.p.m.

The following examples demonstrate attempts to remove carbonyl sulfide from $C_3$ hydrocarbon streams using various well known chemicals. In each case, the hydrocarbon was intimately mixed in liquid phase with the chemical at 100° F. Also, unless otherwise specified, the charge hydrocarbon contained from 30 to 50% by volume propylene and from 50 to 70% by volume propane and other higher boiling hydrocarbons and less than 1% lower boiling hydrocarbons and nonhydrocarbon impurities.

*Example II*

Several samples of the above-specified charge material was contacted with 8% sodium hydroxide solution with the following results:

| Before Treatment, p.p.m. COS | After Treatment, p.p.m. COS | Percent COS Removal |
|---|---|---|
| 28 | 27 | 4 |
| 56 | 42 | 21 |
| 25 | 20 | 20 |
| 153 | 84 | 45 |
| 125 | 63 | 51 |
| 122 | 56 | 54 |

The above data indicate that sodium hydroxide is not effective in removing COS to an acceptable level.

*Example III*

Other unsuccessful attempts to remove carbonyl sulfide performed as hereinabove described are summarized in the following tabulation:

| Before Treatment, p.p.m. COS | After Treatment, p.p.m. COS | Percent COS Removal |
|---|---|---|
| A. 8% NaOH+0.8% $NaAlO_2$ | | |
| 64 | 36 | 37 |
| 50 | 32 | 36 |
| 56 | 27 | 49 |
| 84 | 35 | 58 |
| B. 8% NaOH+1% Phenol | | |
| 144 | 60 | 58 |
| 120 | 46 | 62 |
| 119 | 52 | 56 |
| 140 | 69 | 51 |
| 227 | 71 | 69 |
| 181 | 102 | 44 |
| 171 | 81 | 53 |
| 139 | 84 | 40 |
| 161 | 71 | 56 |
| 139 | 66 | 53 |
| C. 20% Aqueous Monoethanolamine (MEA) | | |
| 104 | 22 | 76 |
| 87 | 4 | 95 |
| 39 | 27 | 32 |
| 48 | 0.5 | 98 |
| 35 | 11 | 68 |
| 36 | 7 | 79 |
| D. 20% Aqueous MEA+1% of 8% NaOH | | |
| 52 | 22 | 59 |
| 45 | 8 | 79 |
| 42 | 17 | 58 |
| 29 | 17 | 42 |
| 60 | 8 | 85 |
| 52 | 7 | 88 |
| 84 | 8 | 91 |
| 69 | 10 | 87 |
| 80 | 49 | 27 |
| 102 | 45 | 55 |
| 81 | 45 | 49 |

None of the above chemicals was effective in consistently reducing the carbonyl sulfide content to an acceptable level. The monoethanolamine runs were in part successful. Note under item C that one test reduced the COS from 48 p.p.m. to less than 0.5 p.p.m. However, other tests using MEA only reduced COS content to 22, 27 and 11 p.p.m. These latter values are too high to achieve the most benefit in the propylene polymerization step.

*Example IV*

Propylene samples were obtained from the above described commercial process prior to the soda-lime treatment and processed individually through a soda-lime bed. The following results were noted:

| Before Treatment, p.p.m. COS | After Treatment, p.p.m. COS | Percent COS Removal |
|---|---|---|
| 59 | <0.5 | 98 |
| 150 | 1 | 99 |
| 167 | 4 | 97 |
| 122 | <0.5 | 99 |
| 67 | <0.5 | 98 |
| 79 | <0.5 | 99 |
| 34 | 4 | 96 |

The above data clearly show that soda-lime consistently removes 96-99% of the carbonyl sulfide present in $C_3$ hydrocarbons and consistently reduces the COS content of such hydrocarbons to less than 5 p.p.m., usually less than 0.5 p.p.m.

I claim:

1. Process for purifying liquefied normally gaseous hydrocarbons containing carbonyl sulfide which comprises contacting the liquid hydrocarbons with soda-lime.

2. Process according to claim 1 wherein said liquefied normally gaseous hydrocarbon is propylene.

3. In a process for polymerizing propylene to a solid polymer by means of a polymerization catalyst system which is adversely acected by carbonyl sulfide, the step of producing a suitable feed for the polymerization reaction which comprises contacting liquefied propylene containing carbonyl sulfide with soda-lime, whereby the carbonyl sulfide content of the propylene is substantially reduced.

4. Process for recovering substantially carbonyl sulfide-free propylene from a mixture of normally gaseous hydrocarbons which consists essentially of liquefying the mixture, passing said mixture in intimate contact with an aqueous solution of monoethanolamine into a separation zone, withdrawing liquefied hydrocarbons of reduced carbonyl sulfide content, passing said liquefied hydrocarbons into a first distillation zone, separately withdrawing those hydrocarbons containing primarily less than three carbon atoms per molecule, separately withdrawing hydrocarbons comprising essentially a mixture of propane and propylene, passing the said propane-propylene mixture into a second distillation zone, separately removing hydrocarbon comprising essentially propane, separately withdrawing hydrocarbon comprising essentially propylene, passing said propylene in liquid phase into a contact zone containing soda-lime, withdrawing substantially carbonyl sulfide-free propylene containing moisture, passing said moisture-containing propylene into a drying zone to remove moisture, and recovering substantially moisture-free and carbonyl sulfide-free propylene.

5. Process according to claim 1 wherein said hydrocarbons contain from 34–167 p.p.m. carbonyl sulfide.

6. Process which comprises contacting liquefied propylene containing from 34–167 p.p.m. carbonyl sulfide with soda-lime whereby the carbonyl sulfide content of said propylene is reduced to less than 5 p.p.m.

References Cited by the Examiner

UNITED STATES PATENTS

| | | | |
|---|---|---|---|
| 2,301,588 | 11/1942 | Schulze et al. | 208—236 |
| 2,951,880 | 9/1960 | Wride | 260—94.9 X |
| 2,959,627 | 11/1960 | Fleming et al. | 260—677 |
| 3,000,988 | 9/1961 | Karchmer et al. | 260—677 |

ALPHONSO D. SULLIVAN, *Primary Examiner.*

ABRAHAM RIMENS, *Examiner.*

G. C. HONEYCUTT, D. S. ABRAMS, *Assistant Examiners.*